US 8,612,651 B2

(12) United States Patent
Boonstra et al.

(10) Patent No.: US 8,612,651 B2
(45) Date of Patent: Dec. 17, 2013

(54) FIFO BUFFER

(75) Inventors: Johannes Boonstra, Deurne (NL);
Sundaravaradan Rangarajan,
Bangalore (IN); Rajendra Kumar,
Bangalore (IN)

(73) Assignee: NXP, B.V., Eindhoven (NL)

( * ) Notice: Subject to any disclaimer, the term of this patent is extended or adjusted under 35 U.S.C. 154(b) by 341 days.

(21) Appl. No.: 12/599,062

(22) PCT Filed: May 14, 2008

(86) PCT No.: PCT/IB2008/051894
§ 371 (c)(1),
(2), (4) Date: Nov. 6, 2009

(87) PCT Pub. No.: WO2008/142610
PCT Pub. Date: Nov. 27, 2008

(65) Prior Publication Data
US 2010/0306426 A1    Dec. 2, 2010

(30) Foreign Application Priority Data

May 16, 2007  (EP) .................................... 07108299

(51) Int. Cl.
*G06F 3/00*         (2006.01)
*G06G 5/00*         (2006.01)
(52) U.S. Cl.
USPC ......................................................... 710/57
(58) Field of Classification Search
USPC ......................................................... 710/57
See application file for complete search history.

(56) References Cited

U.S. PATENT DOCUMENTS

| 3,421,147 | A |   | 1/1969  | Burton et al. |
| 5,426,756 | A |   | 6/1995  | Shyi et al. |
| 5,473,756 | A |   | 12/1995 | Traylor |
| 5,587,953 | A |   | 12/1996 | Chung |
| 5,699,530 | A |   | 12/1997 | Rust et al. |
| 5,873,089 | A |   | 2/1999  | Regache |
| 6,075,931 | A |   | 6/2000  | Panwar |
| 6,101,329 | A | * | 8/2000  | Graef .............................. 710/52 |

(Continued)

OTHER PUBLICATIONS

IBM Technical Disclosure Bulletin; "Improved First-In First-Out"; vol. 39, No. 4; Apr. 1996; pp. 45-46; XP000587415.

(Continued)

*Primary Examiner* — Chun-Kuan Lee

(57) ABSTRACT

A FIFO memory circuit is for interfacing between circuits with different clock domains. The circuit has a FIFO memory (10), a write pointer circuit (16) clocked by the clock of a first clock domain and controlling the memory location to which data is written, and a read pointer circuit clocked by the clock of a second clock domain and controlling the memory location from which data is read. The read and write pointer circuits use gray coding. The memory circuit further comprises a duplicate write pointer circuit (30) which has its write pointer address incremented synchronously with the write pointer circuit (16), and which has a starting write address selected such that the duplicate write pointer address lags behind the write pointer address circuit by a number of address locations corresponding to the size of the FIFO memory (10). A comparator (34) compares the read pointer circuit address with the duplicate write pointer circuit address for determining a full status of the FIFO memory.

11 Claims, 4 Drawing Sheets

(56) References Cited

U.S. PATENT DOCUMENTS

| | | | |
|---|---|---|---|
| 6,191,992 B1 | 2/2001 | Komoto | |
| 6,389,490 B1 | 5/2002 | Camilleri et al. | |
| 6,553,448 B1 | 4/2003 | Mannion | |
| 6,794,997 B2 * | 9/2004 | Sprouse | 341/50 |
| 7,185,125 B2 | 2/2007 | Rougnon-Glasson | |
| 7,293,149 B2 * | 11/2007 | Lo | 711/167 |
| 7,519,746 B2 | 4/2009 | Shiraishi | |
| 2004/0062323 A1 | 4/2004 | Taylor et al. | |
| 2004/0255188 A1 | 12/2004 | Lo | |
| 2005/0286506 A1 | 12/2005 | LaBerge | |

OTHER PUBLICATIONS

Tan K-C B., et al; "Low Power Multi-Segment Sequential One Hot Addressing Architecture"; IEEE Proceedings; Circuits Devices and Systems, vol. 153, No. 2; Apr. 2006; pp. 159-166.

International Search Report for Application No. PCT/IB2008/051894 (Nov. 27, 2008).

Cummings, Clifford E., Simulation and synthesis techniques for asynchronous FIFO design, Sunburst Design, Jun. 16, 2005.

Cummings, Clifford E. and Alfke, Peter, Simulation and synthesis techniques for asynchronous FIFO design with asynchronous pointer comparisons, Sunburst Design, Apr. 19, 2002.

\* cited by examiner

FIFO BUFFER

This invention relates to FIFO (first in first out) buffer designs for interfacing between different clock domains.

State-of-the-art Systems-on-Chip (SoC) have multiple clock domains, in which digital logic is implemented. Clock domains can have independent frequencies and/or phases. While communicating between clock domains meta-stability may occur: temporarily a circuit enters a state between 0 and 1. To safely communicate between domains, typically synchronization flip-flops are used in combination with a handshake scheme.

To communicate large quantities of data across a clock domain crossing, it is well known to use a First-In-First-Out hardware buffer (FIFO). The writing end of the FIFO resides in the first clock domain and the reading end of the FIFO resides in the second clock domain.

The FIFO consists of a storage element (memory, flip-flops or latches) and control logic. The control logic generates the write and read addresses for accessing the memory and the control logic takes care of the synchronization between the clock domains. These write and read addresses are determined by read and write pointers.

The write pointer points to the next word to be written. During a FIFO write operation (clocked by the first clock domain), the memory location that is pointed to by the write pointer is written, and then the write pointer is incremented to point to the next location to be written.

Similarly, the read pointer points to the current FIFO word to be read.

On reset, both read and write pointers are set to zero. The FIFO is then empty, and an empty flag is used to indicate this. After a first data word is written to the FIFO, the write pointer increments, the empty flag is cleared, and the read pointer addresses the contents of the first FIFO memory word. This first word is pushed to the FIFO data output port. The read pointer is always pointing to the next FIFO word to be read, so that the receiver logic does not have to use two clock periods to read the data word.

The FIFO is empty when the read and write pointers are both equal. This condition happens when both pointers are reset to zero during a reset operation, or when the read pointer catches up to the write pointer, having read the last word from the FIFO.

The FIFO is used as a circular memory device. The FIFO can become full (for example if the write clock frequency is higher than the read clock frequency), and there is accordingly a maximum data transfer capacity. The FIFO is full when the pointers are again equal, but this time the write pointer has wrapped around and caught up to the read pointer. To avoid data being written to the memory which overwrites the location of unread data, the preceding write pointer state needs to be detected. There are a number of ways to do this, one of which is to introduce a sign bit. The FIFO is then full if the pointers are equal but the sign bit is not equal.

To efficiently synchronize between clock domains the address pointers are typically implemented using gray coding. Gray codes allow one bit to change for each clock transition, avoiding multiple changing signals on one clock edge. The FIFO will be empty if the read gray pointer is equal to the write gray pointer as outlined above. For the case of an additional MSB sign bit being added, the FIFO will be full if the two upper bits of the read gray pointer are the inverse of the two upper bits of the write gray pointer and the remaining bits are equal. This is because of the reflected nature of the gray code. The sequence of the lower (n−2) bits of the gray code in the first half of the sequence is repeated in the second half of the sequence, but with the first two bits inverted. The FIFO memory size corresponds to (n−1) bits, i.e. half the full gray code cycle, and half of the gray code can be detected based on inversion of the two MSBs.

FIG. 1 shows a known FIFO circuit including the storage elements and the control gray counter logic consisting of gray state registers, synchronization registers and full/empty detection logic.

The FIFO circuit comprises a memory 10, a multiplexer architecture 12 for write addressing the memory based on a gray coded address signal and a multiplexer architecture 14 for read addressing the memory based on a gray coded address signal.

A gray coded write address pointer 16 is incremented at each cycle of the write clock domain by unit 18, and the write address pointer output is provided to the multiplexer arrangement 12.

A gray coded read address pointer 20 is incremented at each cycle of the read clock domain by unit 22, and the read address pointer output is provided to the multiplexer arrangement 14.

A FIFO full status is based on a comparison of the write pointer address and a resynchronized read pointer address.

By inverting the two MSBs of the resynchronized read pointer address using inverter 24, equality between this value and the write pointer address is used to indicate a FIFO full status, based on an additional MSB sign bit being used as explained above. A FIFO empty status is based on a comparison of the read pointer address and a resynchronized write pointer address, with equality used to indicate a FIFO empty status.

The nature of gray coding prevents a gray sequence to be of arbitrary length. In fact, a gray code sequence length will always be a multiple of 4. In practice, this means that a clock domain crossing FIFO that uses just one read pointer and one write pointer will have an even number of entries (depth).

The use of gray or binary coded address also introduces a long path for reading the FIFO. One of the registers needs to be selected for reading, resulting in the trees of multiplexers 12,14, which introduce significant delays.

According to a first aspect of the invention, there is provided a FIFO memory circuit for interfacing between circuits with different clock domains, comprising:

a FIFO memory;

a write pointer circuit clocked by the clock of a first clock domain and controlling the memory location to which data is written; and a read pointer circuit clocked by the clock of a second clock domain and controlling the memory location from which data is read, wherein the read and write pointer circuits use gray coding, and wherein the memory circuit further comprises a duplicate gray coding write pointer circuit which has its write pointer address incremented synchronously with the write pointer circuit, and which has a starting write address selected such that the duplicate write pointer address lags behind the write pointer address circuit by a number of address locations corresponding to the size of the FIFO memory, and wherein the memory circuit further comprises a comparator for comparing the read pointer circuit address with the duplicate write pointer circuit address for determining a full status of the FIFO memory.

This arrangement uses (in addition to the conventional read and write gray pointers) a further write pointer, which may be considered to be a shadow pointer. This starts at minus the FIFO size (gray coded). The shadow pointer is used to determine the full state of the FIFO. Using this shadow pointer arbitrary sided FIFOs can be realized, including even and odd sized. The FIFO will be full if both pointers, including any sign bit, are equal.

Preferably, the comparator comprises a circuit for detecting equality of the duplicate write pointer address and the read pointer address. This avoids the need for complicated techniques to determine the full state of a FIFO.

A comparator may also be used for comparing the read pointer circuit address with the write pointer circuit address for determining an empty status of the FIFO memory. The comparator then comprises a circuit for detecting equality of the write pointer address and the read pointer address.

According to a second aspect of the invention, there is provided a FIFO memory circuit for interfacing between circuits with different clock domains, comprising:

a FIFO memory;

a write pointer circuit clocked by the clock of a first clock domain and controlling the memory location to which data is written; and a read pointer circuit clocked by the clock of a second clock domain and controlling the memory location from which data is read, wherein the read and write pointer circuits use gray coding, and wherein the memory circuit further comprises a first conversion circuit for converting the read pointer circuit address to a one-hot signal and for controlling the read address of the FIFO memory, and wherein the read and write pointer circuit gray coded values are used to obtain empty and full status information of the FIFO memory.

This aspect of the invention enables the speed of the FIFO read process to be increased, by providing an additional shadow register storing the read address in a one-hot encoded value.

The conventional multiplexer hierarchy of the read architecture can then be replaced with an AND, reduce OR tree and reducing the delay from the address register to the data outputs.

The same pointer logic can be implemented at the write port to improve timing. In this case, the circuit further comprises a second conversion circuit for converting the write pointer circuit address to a one-hot signal and for controlling the write address of the FIFO memory.

The FIFO memory is preferably a one-hot addressable memory.

Examples of the invention will now be described in detail with reference to the accompanying drawings, in which.

The same reference numbers are used in the figures to denote the same components.

Figure 1:
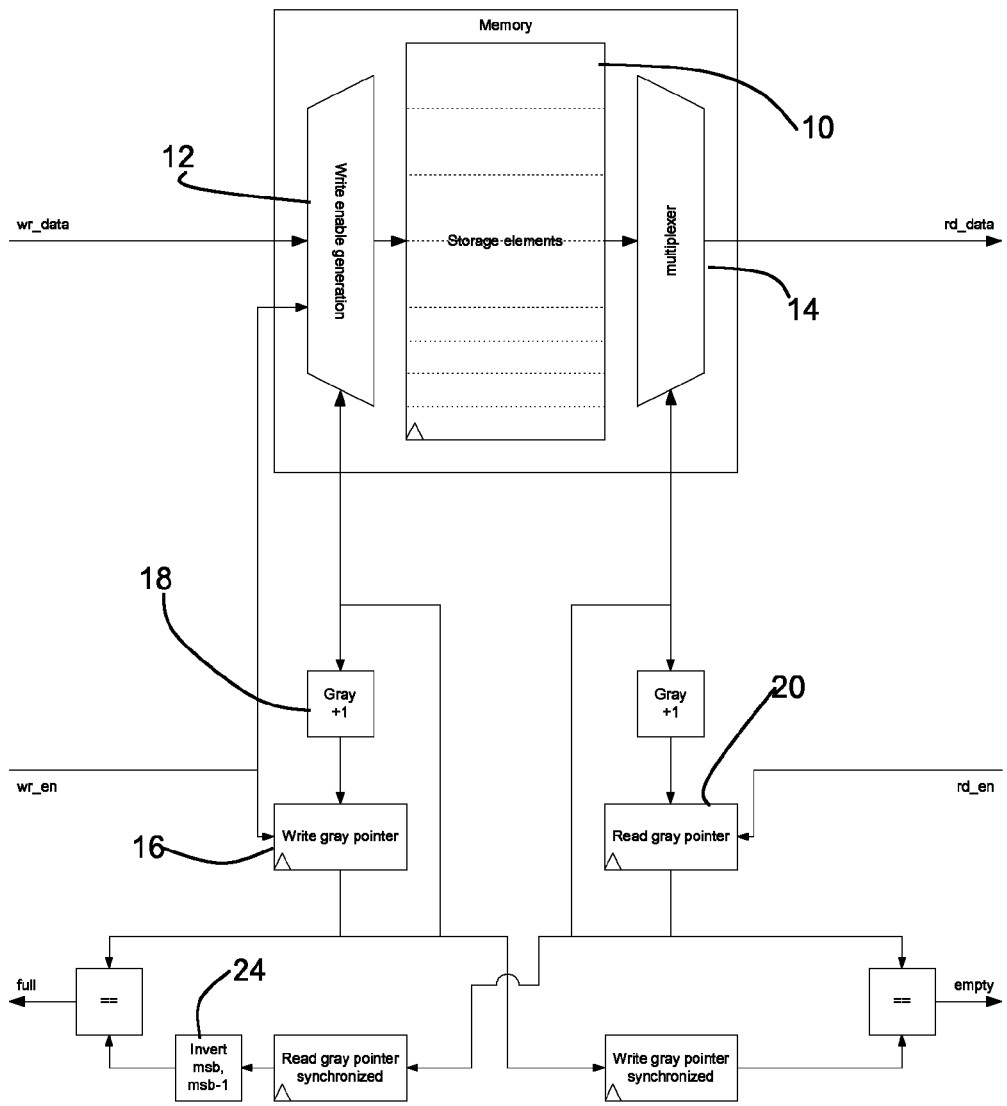
FIG. 1 shows a known FIFO memory circuit for interfacing between circuits with different clock domains.
Figure 2:
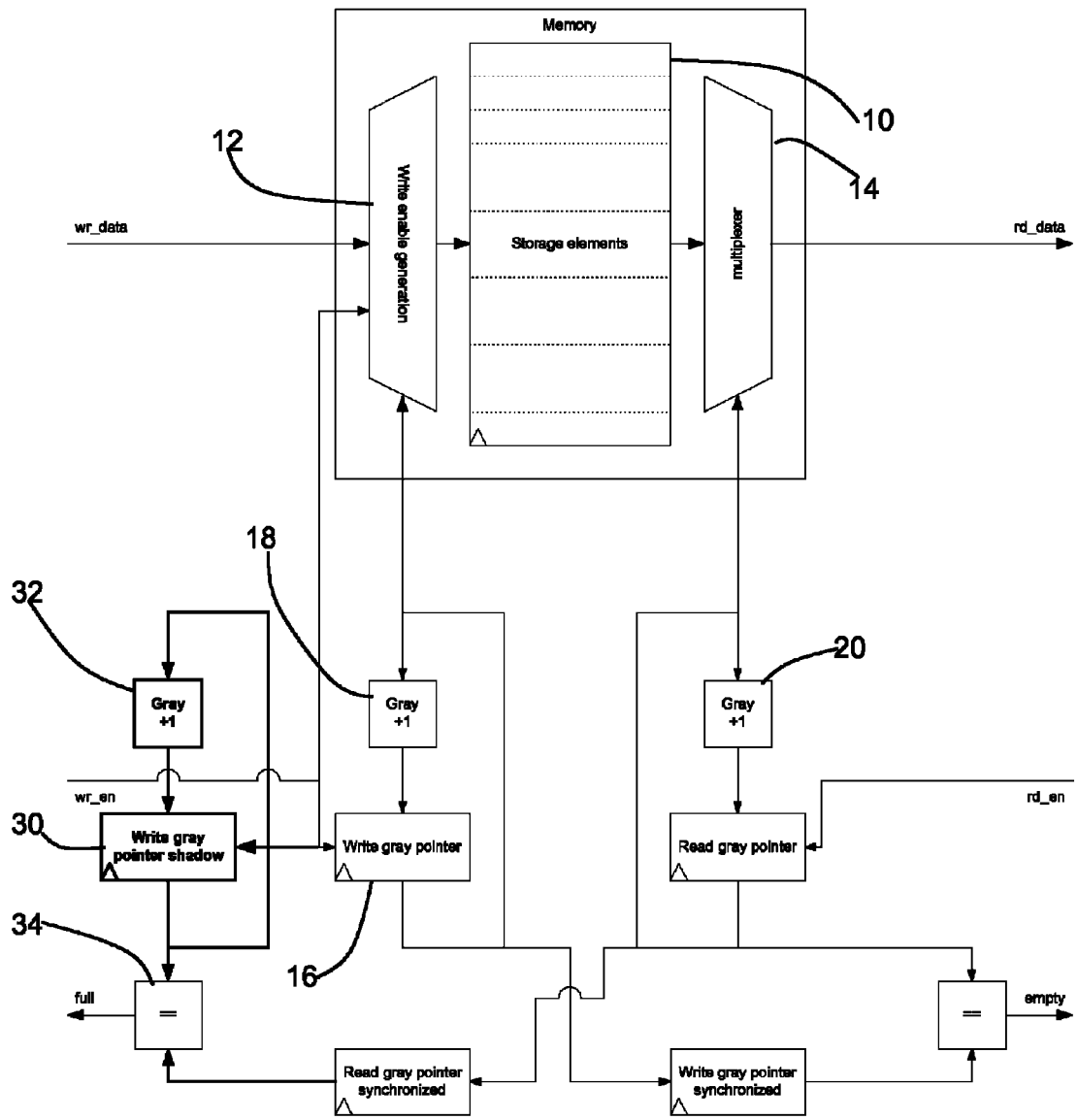
FIG. 2 shows a first example of FIFO memory circuit of the invention.

FIG. 2 shows a first example of memory circuit of the invention. The circuit of FIG. 2 corresponds to the circuit of FIG. 1, with the addition of a duplicate gray coding write pointer circuit 30 and associated increment circuit 32. The duplicate circuit 30 has its write pointer address incremented synchronously with the write pointer circuit (namely under the control of the clock of the first clock domain, on the write side of the FIFO).

The starting write address is selected such that the duplicate write pointer address lags behind the write pointer address circuit by a number of address locations corresponding to the size of the FIFO memory. In other words, the duplicate write pointer starts at the gray coded value corresponding minus the FIFO size (the gray coding is cyclical).

This enables arbitrary size FIFOs to be used. By allowing FIFOs to have arbitrary depth instead of only even depth, the silicon area can be reduced.

The FIFO can be of arbitrary size by using an additional set of read/write address registers, generating the memory address. This additional set of registers can be binary or one-hot coded. In this case, the gray code registers are only used to generate the full/empty status.

In this case, there will be six registers:
read and write pointer;
read and write shadow pointer;
read and write address.

The comparator 34 is then for comparing the resynchronized read pointer circuit address with the duplicate write pointer circuit address, for determining a full status of the FIFO memory. This avoids the need to process the read pointer address in the manner shown in FIG. 1 before implementing the comparison.

The duplicate write pointer may be considered to be a shadow pointer.

The empty status can be detected using the conventional approach shown in FIG. 1.

Figure 3:
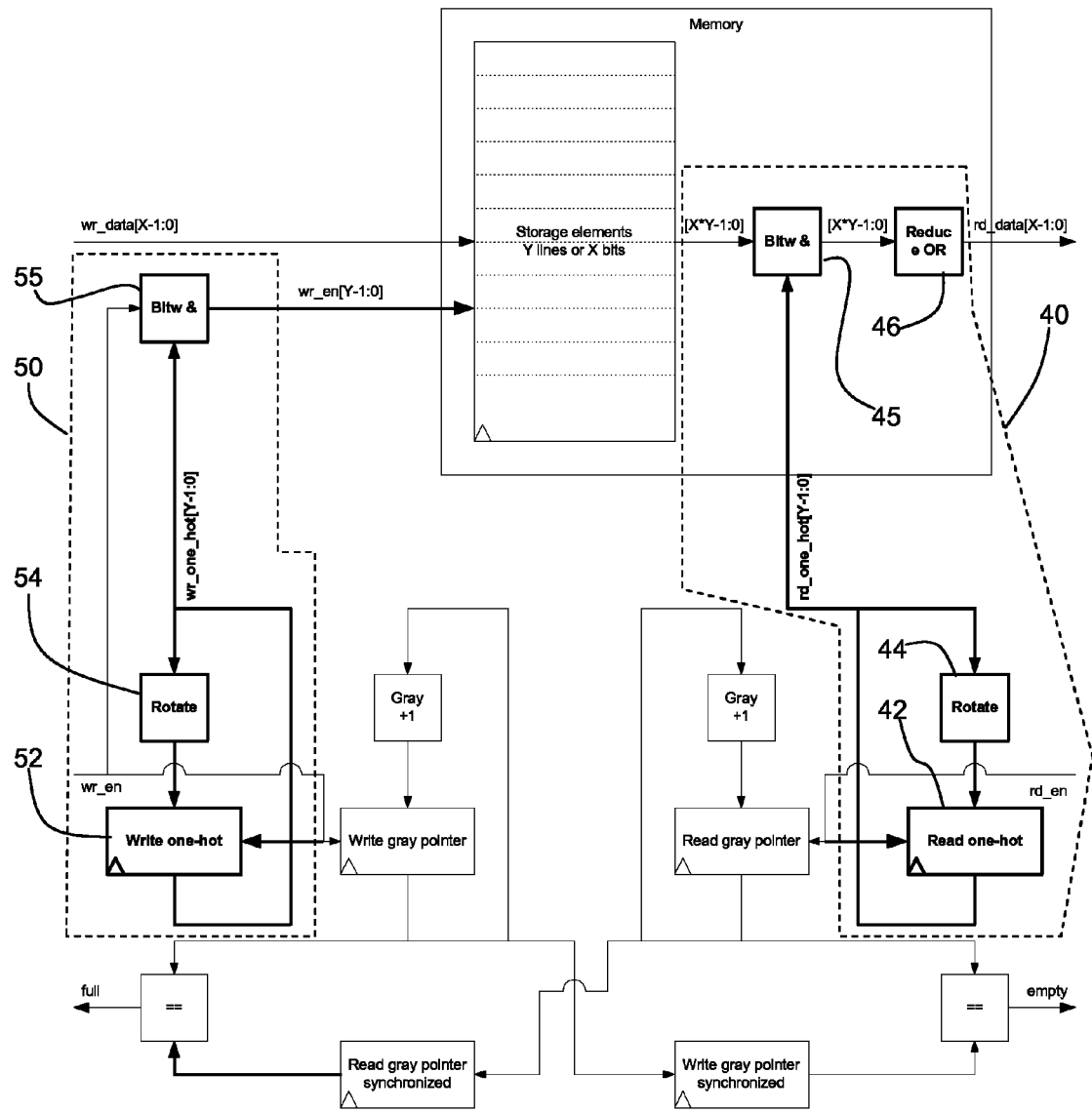
FIG. 3 shows a second example of FIFO memory circuit of the invention.

FIG. 3 shows a second example of memory circuit of the invention, and which increases the speed of operation.

The circuit of FIG. 3 uses the same gray coded read and write pointers as the circuit of FIG. 1 and uses the same techniques for detecting full and empty status (although not shown in as much detail in FIG. 3). The memory circuit further comprises a first conversion circuit 40 for converting the read pointer circuit address to a one-hot signal and for controlling the read address of the FIFO memory.

In this way, one-hot coded addresses are used for reading the storage elements. For a simple FIFO, standard flip-flops or latches can be used. In the case of a memory or register file implementation, a one-hot addressable memory is required.

This use of one-hot memory reading enables the speed of the FIFO read process to be increased.

The first conversion circuit 40 comprises a circuit 42 for storing a one-hot address and a rotation circuit 44 which acts as an increment circuit, moving the one-hot "1" one bit space. The one-hot value is provided to an addressing logic circuit based on adders 45 and an OR tree 46 to derive the memory location to be addressed. The circuit of FIG. 3 thus combines the advantage of gray coding for implementing the FIFO full and empty status flags, and the advantages of one-hot memory reading. The circuit provides improved timing of the write data input and the read data output, resulting in a higher operating frequency and/or lower power dissipation.

In this arrangement, the gray code registers (regular and shadow) are only used to handshake between the two clock domains and detect full/empty status; the one-hot registers are used to do the actual memory access. Using one-hot coding will reduce access time to the memory (compared to gray or binary codes) hence increasing operating frequency.

The write address may be implemented using conventional gray coding in the manner shown in FIG. 1. However, FIG. 3 shows a modification in which the write address circuitry replicates the one-hot read circuitry. In this way, one-hot coded addresses are also used for writing to the storage elements. The circuit then further comprises a second conversion circuit 50 for converting the write pointer circuit address to a one-hot signal and for controlling the write address of the FIFO memory.

The second conversion circuit 50 comprises a circuit 52 for storing a one-hot address and a rotation circuit 54 which acts as an increment circuit, moving the one-hot "1" one bit space. The one-hot value is provided to an addressing logic circuit based on adders 55.

The conversion circuits for converting one-hot signals to memory address signals are different on the read and write sides because writing and reading have different requirements. When writing, one of the memory locations needs to be enabled (using unit 45), and each bit in the one-hot code corresponds to an enable for one memory location. When reading, one of the memory locations needs to be selected, and each bit in the read one-hot register corresponds to a memory location. By logically ANDing these bits with their corresponding memory location (in unit 55) and logically ORing the result (in unit 46) the register can be read.

The FIFO memory can be implemented as a one-hot addressable memory. In this case, circuits 55, 45 and 46 can be implemented as part of the memory itself.

Figure 4:
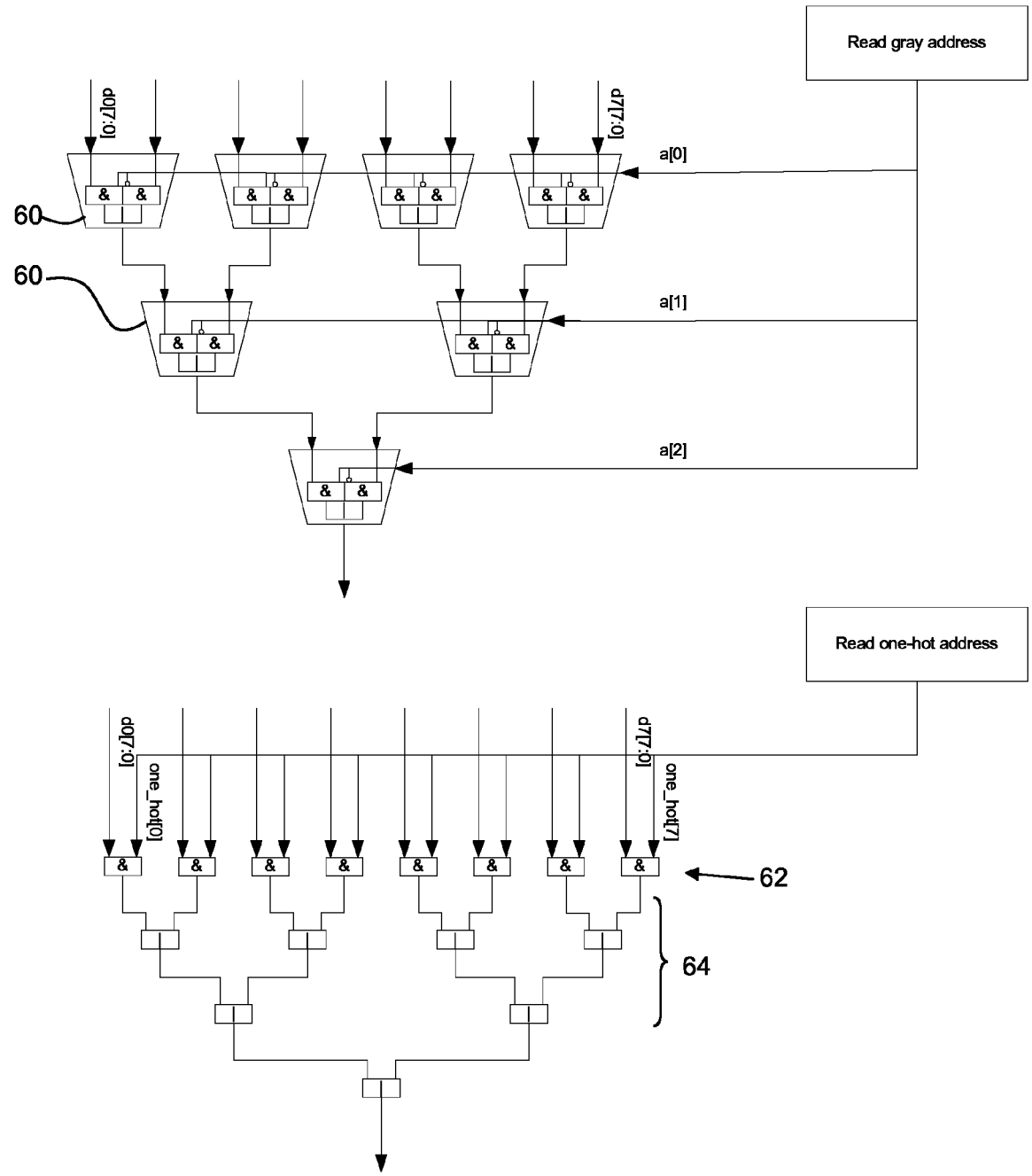
FIG. 4 shows conversion circuitry used in the circuit of FIG. 3.

FIG. 4 shows illustrates the register reading logic for a gray/binary address (top part of FIG. 4) and for a one-hot address for a FIFO, of depth 8 with 8 bits of data.

The gray/binary circuit converts from gray encoded data to binary encoded data and uses a tree of multiplexer circuits 60. The logic depth for the gray/binary coded address based multiplexer structure is 6 AND/OR layers, and the maximum fanout (bit 0) is 32

The inputs to the circuit are values d0 to d7 at the top of the figure, and these are the values stored in the 8 FIFO locations. At the bottom of the circuit, one of these locations is selected as output vector [7:0].

The one-hot address converter comprises an array of adder circuits 62 and a tree 64 of OR gates. The logic depth for the one-hot coded address based AND/OR structure is 4. The maximum fanout (all bits) is 8.

The circuits of FIG. 4 are conventional and are provided simply to show that one-hot addressing can reduce latency and increase operating frequency.

The reduced logic depth and the reduced fanout obtained by using processing of one-hot signals allows higher operating frequencies, or lower operating voltage and consequently lower power.

The invention can be applied to a wide variety of silicon on chip circuits having multiple clock domains and associated clock domain crossings. The FIFO circuits can form part of on-chip bus bridges and interface modules.

Various other modifications will be apparent to those skilled in the art.

The invention claimed is:

1. A FIFO memory circuit for interfacing between circuits with different clock domains, comprising:
    a FIFO memory;
    a write pointer circuit clocked by a clock of a first clock domain and controlling a memory location to which data is written; and
    a read pointer circuit clocked by a clock of a second clock domain and controlling a memory location from which data is read,
    wherein the read and write pointer circuits use gray coding, and wherein the memory circuit further comprises a duplicate write pointer circuit which has its write pointer address incremented synchronously with the write pointer circuit, and which has a starting write address selected such that the duplicate write pointer address lags behind the write pointer address circuit by a number of address locations corresponding to a size of the FIFO memory, and wherein the memory circuit further comprises a comparator for comparing the read pointer circuit address with the duplicate write pointer circuit address for determining a full status of the FIFO memory.

2. A memory circuit as claimed in claim 1, further comprising a resynchroniser for resynchronising the read pointer to the clock of the first clock domain, and wherein the comparator is for comparing the resynchronized read pointer circuit address with the duplicate write pointer circuit address.

3. A memory circuit as claimed in claim 1, wherein the comparator comprises a circuit for detecting equality of the duplicate write pointer address and the read pointer address.

4. A memory circuit as claimed in claim 1, further comprising a second comparator for comparing the read pointer circuit address with the write pointer circuit address for determining an empty status of the FIFO memory.

5. A memory circuit as claimed in claim 4, further comprising a resynchroniser for resynchronising the write pointer to the clock of the second clock domain, and wherein the second comparator is for comparing the resynchronized write pointer circuit address with the read pointer circuit address.

6. A memory circuit as claimed in claim 4, wherein the comparator comprises a circuit for detecting equality of the write pointer address and the read pointer address.

7. The memory circuit of claim 1, wherein a duplicate write pointer of the duplicate write pointer circuit starts at a gray coded write pointer address of the write pointer circuit minus the size of the FIFO memory.

8. A FIFO memory circuit for interfacing between circuits with different clock domains, comprising:
    a FIFO memory;
    a write pointer circuit clocked by a clock of a first clock domain and controlling a memory location to which data is written; and
    a read pointer circuit clocked by a clock of a second clock domain and controlling a memory location from which data is read,
    wherein the read and write pointer circuits use gray coding, and wherein the memory circuit further comprises a first conversion circuit for converting the read pointer circuit address to a one-hot signal and for controlling the read address of the FIFO memory, and wherein the read and write pointer circuit gray coded values are used to obtain empty and full status information of the FIFO memory, wherein the first conversion circuit comprises a logic structure having AND gates, and a logic structure having an OR tree.

9. A memory circuit as claimed in claim 8, further comprising a second conversion circuit for converting the write pointer circuit address to a one-hot signal and for controlling the write address of the FIFO memory.

10. The memory circuit of claim 8, wherein the memory circuit further comprises a duplicate write pointer circuit which has its write pointer address incremented synchronously with the write pointer circuit, and which has a starting write address selected such that the duplicate write pointer address lags behind the write pointer address circuit by a number of address locations corresponding to a size of the FIFO memory.

11. The memory circuit of claim 10, wherein a duplicate write pointer of the duplicate write pointer circuit starts at a gray coded write pointer address of the write pointer circuit minus the size of the FIFO memory.

* * * * *